H. C. WHITE.
PROJECTING APPARATUS.
APPLICATION FILED DEC. 29, 1910.
993,425.
Patented May 30, 1911.
2 SHEETS—SHEET 1.
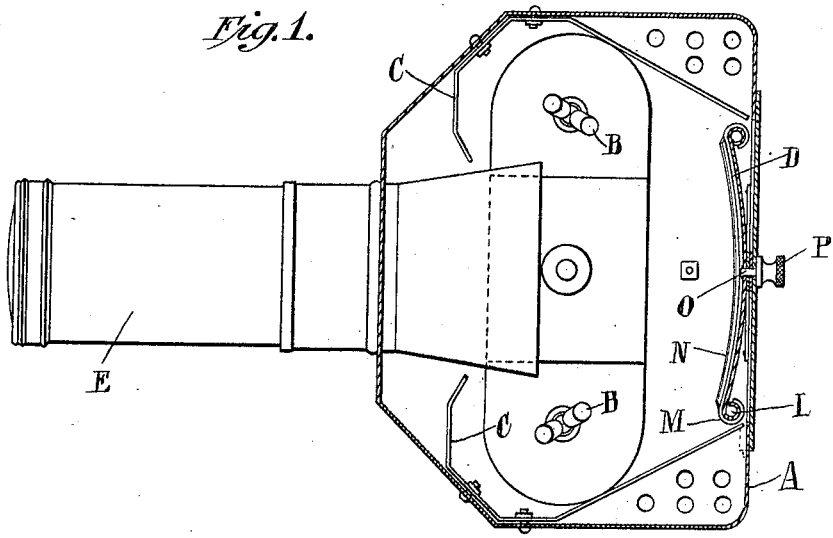
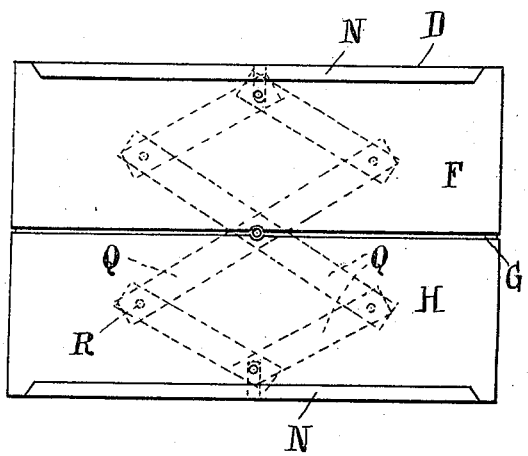
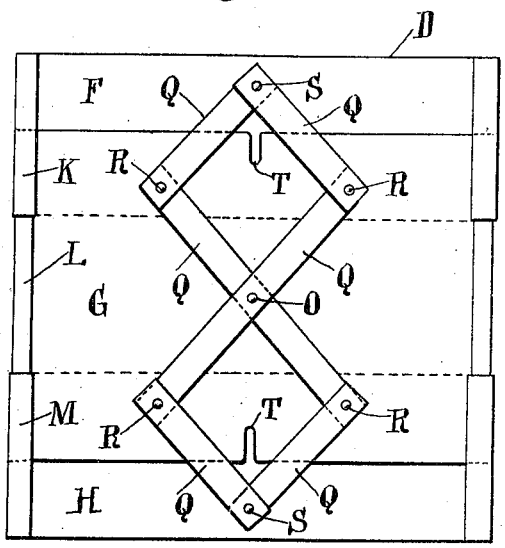
Attest:
Inventor:
Hawley C. White
by Dickerson, Brown, Raegener & Binney
Attys

H. C. WHITE.
PROJECTING APPARATUS.
APPLICATION FILED DEC. 29, 1910.

993,425.

Patented May 30, 1911.
2 SHEETS—SHEET 2.

Attest:
Inventor:
by Hawley C. White.
Dickerson, Brown, Raegener & Motty
Att'ys

UNITED STATES PATENT OFFICE.

HAWLEY C. WHITE, OF NORTH BENNINGTON, VERMONT, ASSIGNOR TO H. C. WHITE CO., OF NORTH BENNINGTON, VERMONT, A CORPORATION OF VERMONT.

PROJECTING APPARATUS.

993,425.  Specification of Letters Patent.  Patented May 30, 1911.

Application filed December 29, 1910. Serial No. 599,951.

*To all whom it may concern:*

Be it known that I, HAWLEY C. WHITE, a citizen of the United States, and a resident of North Bennington, in the county of Bennington and State of Vermont, have invented certain new and useful Projecting Apparatus, of which the following is a specification.

This invention relates to picture projecting apparatus, and particularly to apparatus adapted to project by reflection opaque pictures placed within the apparatus, and the objects of the invention are to improve the construction of said picture projecting apparatus by providing the same with a new and useful picture holding device for holding the pictures to be projected by means of the apparatus.

To the accomplishment of the above objects and to such others as may hereinafter appear, the invention comprises a picture projecting apparatus provided with an adjustable picture holding device which is also reversible.

While the invention is to be described with particular reference to the details of construction, it is not to be considered as limited thereto, as many changes may be made and still fall within the scope of the appended claims.

Figure 4:
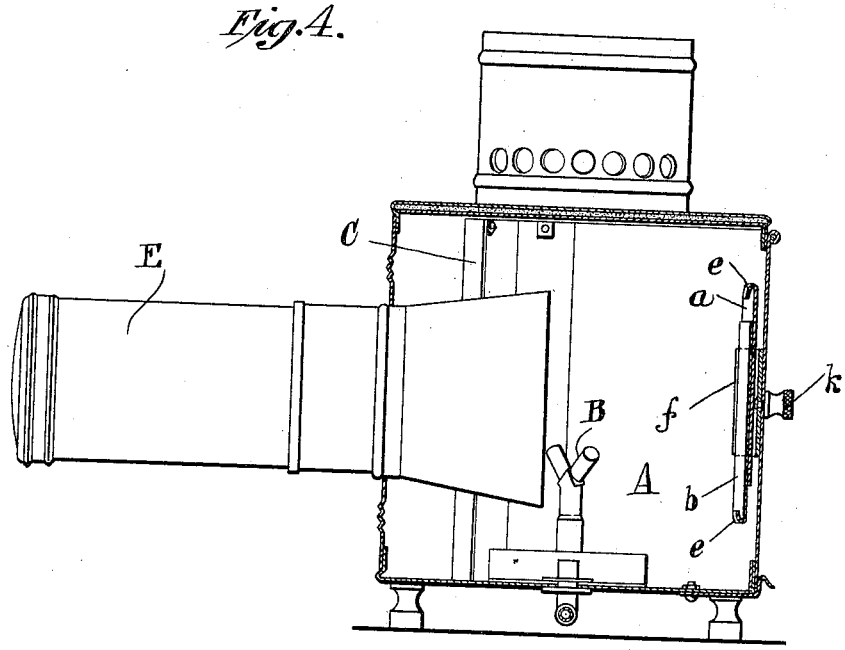
Figure 5:
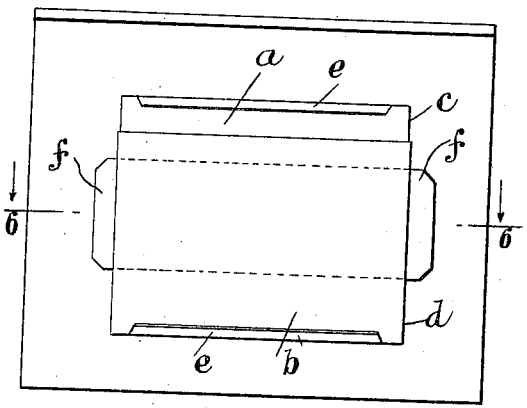
Figure 6:
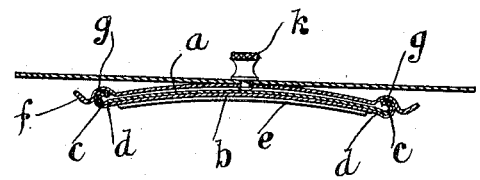

In the drawings: Figure 1 is a plan view of a projecting apparatus partly in section, embodying the invention. Fig. 2 is a front view of a holder made in accordance with the invention. Fig. 3 is a rear view of the holder shown in Fig. 2, in an extended position. Fig. 4 is a side view of the projecting apparatus shown in Fig. 1 partly in section, embodying an alternate form of holder. Fig. 5 is a front view of an alternate form of holder. Fig. 6 is a view in cross-section on the line 6—6 of Fig. 5.

In the drawings A designates the body of a projecting apparatus which is provided with suitable burners B, the light from the burners being reflected by means of suitable reflectors C toward the picture holder D and then out through the lens tube E as is common with this kind of apparatus. In the present instance the picture holder D comprises three members F, G and H, which are movably secured together, the same in the present instance being each provided with suitable beaded edges K, L and M, which fit one inside the other, as clearly shown in Figs. 1 and 3, to accomplish this purpose. The outer members F and H are in the present instance each provided with an overlapping edge N for retaining the edges of the picture to be projected. In the present instance the holder D is pivotally mounted on the back of the body A of the projecting apparatus, shown in Fig. 1, by means of a pin O one end of which is provided with a suitable head P, whereas the other end of the pin O is riveted or otherwise secured to the member G of the holder. By mounting the holder in this manner it will be seen that the holder can be rotated from a horizontal to a vertical position or vice versa to project pictures, usually in the shape of post cards, which appear in either a horizontal or vertical position on the card. It is to be noted that the members comprising the holder are all curved, preferably in the direction of their length, so as to bring the edges of the picture in the direction of its length more nearly in focus.

Most of the pictures used in a projecting apparatus are of the size of a postal card, but very often the pictures desired to be projected are larger and it is for this reason that the present holder is made so that the same can be extended in order to accommodate pictures which will not fit the ordinary holder or the present holder when it is in its closed position, as shown in Fig. 2, but by pulling out the members F and H, the holder will adapt itself to picture cards of a great variety of different sizes.

In extending the holder to accommodate it to a picture which is too large to be inserted in the holder when it is in its closed position, as shown in Fig. 2, it is important, in order to secure uniform focus of the picture, to extend the members F and H equally. In order that the members F and H may be extended equally, a series of short levers Q are provided on the back of the holder, as shown in Fig. 3. The levers Q are pivoted together by means of pins R and also by means of pins S, the latter being also pivoted respectively to the different members of the holder as shown in Fig. 2. From the construction of levers just described, it will be seen that if either the member F or the member H is extended the other member will be correspondingly extended and, vice versa, that is if either the member F or the member H is moved inward the other member will be correspondingly moved. It is to be noted that the arrangement of the levers Q in the form shown in Fig. 3, permits of the holder being pivotally mounted upon the pin O without in any way interfering with the action of the levers.

In the present instance the member G is provided with cut out spaces T which permit of the pins S passing farther inward to close the holder than would otherwise be the case. By providing the cut out spaces T it will be seen that the member G can be made comparatively wide so as to form a firm support for the members F and H when the same are extended.

Instead of constructing the holder as shown in Figs. 1, 2 and 3, the same may be constructed as shown in Figs. 4, 5 and 6. By referring to the latter figures, it will be seen that the holder comprises two members a and b movably secured together, the same in the present instance being each provided with suitable beaded edges c and d, which fit one inside the other, to accomplish this purpose. The members a and b are preferably curved in the direction of their length and provided with overlapping edges e for retaining the edges of the picture to be projected. In the present instance the holder is mounted upon a spring support f, which is curved in the direction of its length to correspond to the curvature of the holder, the spring support f being provided with recesses g, near the edges of the same, into which the beaded portions of the holder fit, as shown in Fig. 6, it being noted that the ends of the support are extended beyond the recesses to provide means for readily disengaging the holder from the support. The spring support f is so curved that the ends have to be forced backward slightly when it is desired to insert the beaded edges c of the holder into the recesses g of the support, the spring action of the support tending to hold the holder firmly in position. The support f is pivotally secured to the back of the projecting apparatus by means of a pivot pin k which permits of the holder being placed in a horizontal or vertical position.

The form of holder just described will adapt itself to hold pictures of different sizes by extending the members a and b to fit the picture to be projected, the holder being easily removed from the support f to adjust and insert the picture after which the holder can be easily put back in the support f, care being taken to place the holder at the center of the support to insure even illumination and focus of the picture.

What I claim is:—

1. A projecting apparatus comprising in combination a holder for holding pictures to be projected, said holder comprising a plurality of members, means for slidably securing said members together, and means for pivotally mounting said holder on said projecting apparatus.

2. A projecting apparatus comprising in combination a holder for holding pictures to be projected, said holder comprising a plurality of members, means for slidably securing said members together, means for pivotally mounting said holder on said projecting apparatus, and means for controlling the movements of the members of said holder, as and for the purposes set forth.

3. A projecting apparatus comprising in combination a holder for holding pictures to be projected, said holder comprising a plurality of members, means for slidably securing said members together, means for pivotally mounting said holder on said projecting apparatus, and a series of levers for controlling the movements of the members of said holder, as and for the purposes set forth.

4. A projecting apparatus comprising in combination a curved holder for holding pictures to be projected, said holder comprising a plurality of curved members, means for slidably securing said members together as and for the purposes set forth.

In testimony whereof I have signed this specification in the presence of two subscribing witnesses.

HAWLEY C. WHITE.

Witnesses:
 FRANKLIN SCOTT,
 HARRIE C. WHITE.

---

Copies of this patent may be obtained for five cents each, by addressing the "Commissioner of Patents, Washington, D. C."